United States Patent
Takatsuka et al.

(10) Patent No.: US 12,176,777 B2
(45) Date of Patent: Dec. 24, 2024

(54) ROTATING ELECTRIC MACHINE AND COIL FIXING METHOD FOR ROTATING ELECTRIC MACHINE

(71) Applicant: NISSAN MOTOR CO., LTD., Yokohama (JP)

(72) Inventors: Takayuki Takatsuka, Kanagawa (JP); Takashi Yanai, Kanagawa (JP); Akihisa Hori, Kanagawa (JP); Akio Tamaru, Kanagawa (JP); Akio Hoshina, Kanagawa (JP); Shuuitsu Aihara, Kanagawa (JP); Toshikazu Nishizawa, Kanagawa (JP); Osamu Nagata, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/578,851

(22) PCT Filed: Jul. 15, 2021

(86) PCT No.: PCT/JP2021/026659
§ 371 (c)(1),
(2) Date: Jan. 12, 2024

(87) PCT Pub. No.: WO2023/286250
PCT Pub. Date: Jan. 19, 2023

(65) Prior Publication Data
US 2024/0266896 A1 Aug. 8, 2024

(51) Int. Cl.
*H02K 3/32* (2006.01)
*H02K 1/24* (2006.01)
(Continued)

(52) U.S. Cl.
CPC .............. *H02K 3/325* (2013.01); *H02K 1/24* (2013.01); *H02K 15/10* (2013.01); *H02K 15/12* (2013.01)

(58) Field of Classification Search
CPC .. H02K 3/12; H02K 3/30; H02K 3/34; H02K 3/345; H02K 3/46; H02K 3/48;
(Continued)

(56) References Cited

U.S. PATENT DOCUMENTS

2007/0117911 A1  5/2007  Irwin et al.
2016/0065025 A1  3/2016  Zhang et al.

FOREIGN PATENT DOCUMENTS

CN    105907273 A       8/2016
JP    2006273969 A   *  10/2006
(Continued)

Primary Examiner — Thomas Truong
(74) Attorney, Agent, or Firm — Foley & Lardner LLP

(57) ABSTRACT

A rotating electric machine in which a coil wrapped in an insulating sheet is fixed to a slot provided in an iron core, wherein the insulating sheet has a porous structure, the coil and the insulating sheet, and the insulating sheet and the iron core are each fixed by an insulating varnish which is brought into a dispersion state by ultrasonic irradiation, and a mixed layer in which the insulating varnish and the insulating sheet are mixed due to penetration of the insulating varnish is formed in at least a predetermined range from a surface layer to an interior of the insulating sheet.

6 Claims, 3 Drawing Sheets

(51) Int. Cl.
*H02K 15/10* (2006.01)
*H02K 15/12* (2006.01)

(58) Field of Classification Search
CPC .... H02K 3/487; H02K 15/00; H02K 15/0018; H02K 15/0031; H02K 15/12; H02K 3/325; H02K 1/24; H02K 15/10; H02K 3/527
See application file for complete search history.

(56) References Cited

FOREIGN PATENT DOCUMENTS

| | | | |
|---|---|---|---|
| JP | 2006-351409 | A | 12/2006 |
| JP | 2007-181814 | A | 7/2007 |
| JP | 2012-167272 | A | 9/2012 |
| JP | 2012239322 | A * | 12/2012 |
| JP | 2020-150611 | A1 | 9/2020 |

* cited by examiner

ROTATING ELECTRIC MACHINE AND COIL FIXING METHOD FOR ROTATING ELECTRIC MACHINE

TECHNICAL FIELD

The present invention relates to a rotating electric machine and a coil fixing method for a rotating electric machine.

BACKGROUND ART

In a rotating electric machine including an iron core, a coil inserted into a slot provided in the iron core, and an insulating sheet interposed between the iron core and the coil, it is known that the coil is hardened by a varnish in order to improve an insulation performance and prevent deformation and movement of the coil. JP 2020-150611 A discloses that by impregnating an interior of a slot with a varnish from gaps between winding wires of a coil, the varnish also penetrates into an insulating sheet made of paper or cloth, and the varnish is also filled between the insulating sheet and a stator.

SUMMARY OF INVENTION

A varnish contains fillers for enhancing an insulation performance and an adhesive performance, and these fillers have a characteristic of easily aggregating. The aggregation increases an apparent particle diameter of the varnish. Therefore, T even when the impregnation is performed with the varnish from the gaps between the winding wires of the coil as in the above document, the varnish may not penetrate into an interior of the insulating sheet, and a sufficient adhesive force may not be obtained. Due to vibration or input of an external force, peeling may occur at an interface between the varnish and the insulating sheet, and the coil may be moved.

Therefore, in view of the above problems, an object of the present invention is to provide a rotating electric machine and a coil fixing method capable of preventing deformation and movement of a coil.

According to one embodiment of the present invention, a rotating electric machine is provided in which a coil wrapped in an insulating sheet is fixed to a slot provided in an iron core. In this rotating electric machine, the insulating sheet has a porous structure, and the coil and the insulating sheet, and the insulating sheet and the iron core are each fixed by an insulating varnish which is brought into a dispersion state by ultrasonic irradiation, and a mixed layer in which the insulating varnish and the insulating sheet are mixed due to penetration of the insulating varnish is formed in at least a predetermined range from a surface layer to an interior of the insulating sheet.

According to another embodiment of the present invention, a coil fixing method for a rotating electric machine is provided in which a coil wrapped in an insulating sheet is fixed to a slot provided in an iron core. In this method, an insulating varnish is brought into a dispersion state by performing irradiation with ultrasonic waves, then the insulating varnish in the dispersion state is impregnated into the insulating sheet and the coil inserted in the slot, and the insulating varnish impregnated into the insulating sheet and the coil is cured.

DESCRIPTION OF EMBODIMENTS

Hereinafter, an embodiment of the present invention will be described with reference to the drawings.

Figure 1:
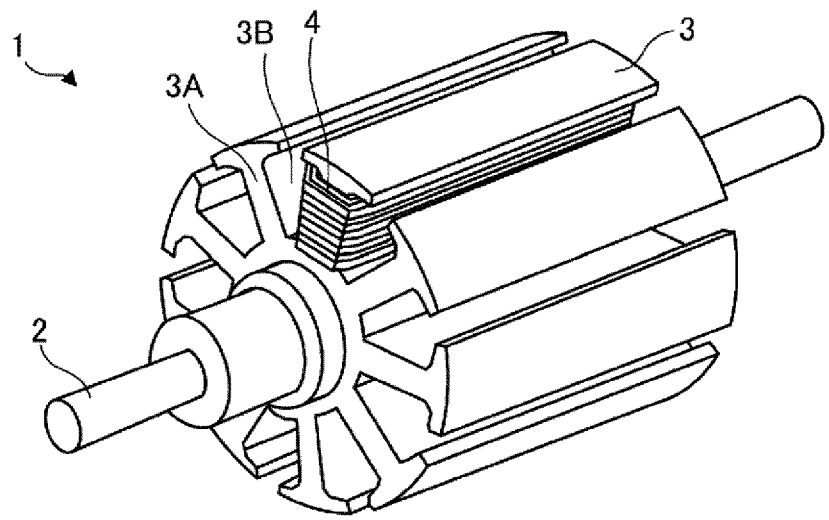
FIG. 1 is a schematic configuration diagram of a rotor of a rotating electric machine.

FIG. 1 is a schematic configuration diagram of a rotor 1 of a rotating electric machine according to the present embodiment. In the present embodiment, a rotating electric machine used as a drive source of a vehicle is assumed, but the present invention is not limited thereto.

The rotor 1 includes a rotor shaft 2 serving as a rotation shaft, an iron core 3 fixedly supported by the rotor shaft 2, and coils 4 fixedly supported by the iron core 3. An insulating sheet 5 (see FIG. 2) that wraps the coil 4 is omitted in FIG. 1.

The iron core 3 is a laminated body of disk-shaped steel plates, and includes a plurality of teeth 3A extending radially with respect to the rotation shaft. A space sandwiched between the adjacent teeth 3A is referred to as a slot 3B.

The coil 4 is formed by winding of winding wires coated with enamel or the like around the tooth 3A. Although only one coil 4 is shown in FIG. 1, the coil 4 is formed in the same way on all the teeth 3A. In other words, the coil 4 is disposed in each slot 3B.

The coil 4 is electrically connected to the outside via a slip ring.

Figure 2:
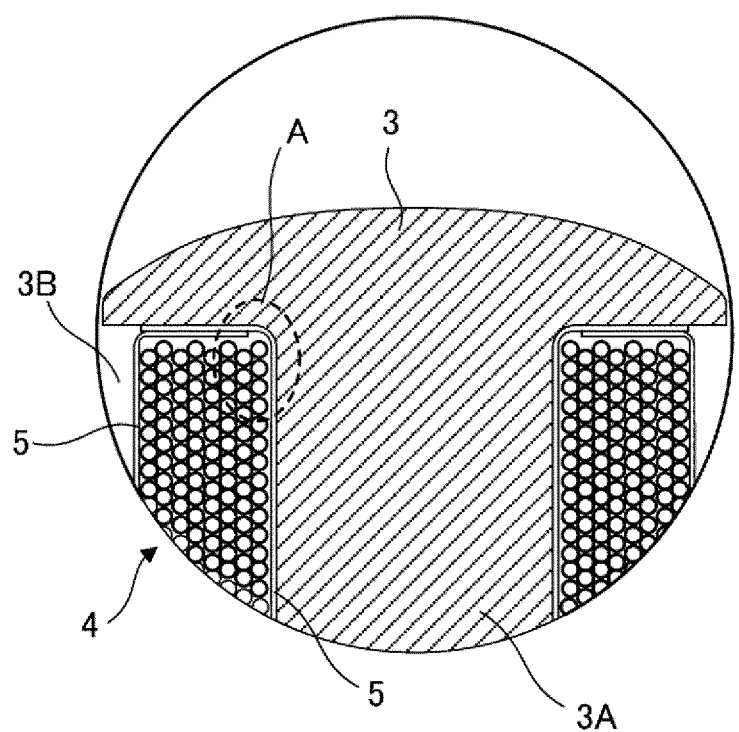
FIG. 2 is an enlarged cross-sectional view of a part of the rotor.

FIG. 2 is an enlarged cross-sectional view in which a part of a cross section of the iron core 3 and the coil 4 along a plane orthogonal to the rotor shaft 2 is enlarged. As shown in the drawing, the insulating sheet 5 is disposed between the iron core 3 and the coil 4. An outer periphery of the coil 4 is also covered with the insulating sheet 5. That is, a portion of the coil 4 located within the slot 3B is wrapped in the insulating sheet 5. Accordingly, the iron core 3 and the coil 4 are insulated from each other, and the adjacent coils 4 are insulated from each other. In a portion of the coil 4 protruding from the iron core 3 in a rotation axis direction, the insulating sheet 5 is interposed only between the iron core 3 and the coil 4.

The insulating sheet 5 used in the present embodiment has a porous structure. For example, the insulating sheet 5 is a so-called mesh-shaped sheet, such as a sheet of nonwoven fabric, paper, or felt formed by intertwining fibrous members, or a sheet of knitted fabric or the like formed by knitting fibrous members. A mesh diameter of the insulating sheet 5 used in the present embodiment is larger than a particle diameter of an insulating varnish 30 in a dispersion state to be described later.

During an operation of the rotating electric machine, an external force such as a centrifugal force acts on the coil 4. It is desirable that deformation of the coil 4 and displacement of the coil 4 with respect to the iron core 3 do not occur even when the external force acts. In addition, when the winding wires are rubbed against each other due to vibration generated during the operation of the rotating electric machine, a coating such as enamel may be damaged.

Therefore, in the present embodiment, in order to prevent the deformation and the displacement of the above coil 4 and improve an insulation property, gaps between the winding wires and a gap between the coil 4 and the iron core 3 are filled with the insulating varnish 30 (see FIG. 4) for mechanically fixing. The insulating varnish 30 used in the present embodiment may be of a solvent type, a non-solvent type, or a water-soluble type as long as the insulating varnish 30 is a varnish generally used for insulating a coil of a rotating electric machine. Hereinafter, a method of fixing using an insulating varnish will be described.

In the present embodiment, the rotor 1 with the coil 4 and the insulating sheet 5 arranged in the slot 3B is immersed in the liquid insulating varnish 30, thereby impregnating the above gaps with the insulating varnish 30. Accordingly, the coil 4 and the insulating sheet 5 are fixed to the iron core 3 using the insulating varnish 30. In the following description, impregnating the above gaps with the insulating varnish 30 may also be referred to as "impregnating the coil 4 with the insulating varnish 30".

Figure 3:
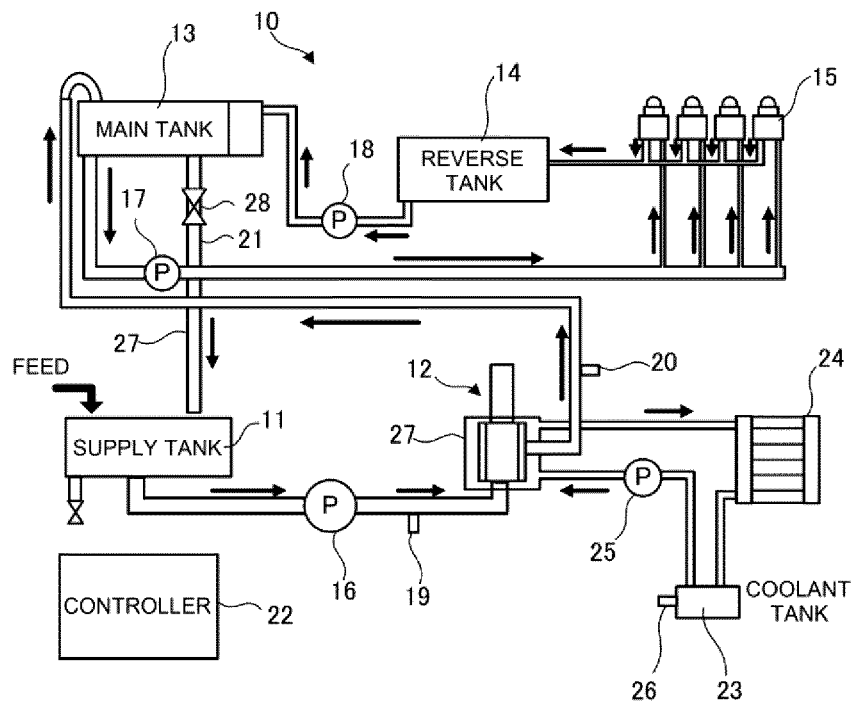
FIG. 3 is a configuration diagram of a device for impregnating a coil with an insulating varnish.

FIG. 3 is a configuration diagram of a device for impregnating the coil 4 with the insulating varnish 30.

The insulating varnish 30 is fed into a supply tank 11 automatically or manually. The insulating varnish 30 in the supply tank 11 is sent from there to an ultrasonic treatment device 12 by a main pump 16, and is supplied to a main tank 13 after being subjected to ultrasonic treatment. The ultrasonic treatment will be described later.

The insulating varnish 30 in the main tank 13 is supplied to immersion tanks 15 by a circulation pump 17, supplied from the immersion tanks 15 to a reverse tank 14, and returned from the reverse tank 14 to the main tank 13 by a reverse pump 18, and this process is repeated thereafter. In FIG. 3, four immersion tanks 15 are shown, but the number of immersion tanks 15 is not limited thereto.

The main tank 13 is provided with a pipe 21 for returning the insulating varnish 30 to the supply tank 11, and when a valve 28 installed in the pipe 21 is opened, the insulating varnish 30 in the main tank 13 can be returned to the supply tank 11.

In the immersion tank 15, an impregnation process of impregnating the coil 4 with the insulating varnish 30 is performed by a so-called immersion method. Specifically, the rotor shaft 2 of the rotor 1 is rotatably supported at a position higher than a liquid surface of the insulating varnish 30 in the immersion tank 15, and the coils 4 are sequentially immersed in the liquid insulating varnish 30 by rotating the rotor shaft 2. By performing this rotation for a predetermined time, the coils 4 can be impregnated with the insulating varnish 30. The "predetermined time" herein is appropriately set in accordance with a shape of the coil 4, the number and density of winding wires, a component of the insulating varnish 30 to be used, and the like. When the impregnation process is completed, the rotor 1 is removed from the device, and the liquid insulating varnish 30 is cured.

The device includes a cooling system that prevents a temperature increase of the insulating varnish 30. The cooling system includes a coolant tank 23, a cooling pump 25 that circulates a coolant, a heat exchange unit 27 that performs heat exchange with the ultrasonic treatment device 12, a radiator 24 that cools the coolant whose temperature increases due to the heat exchange, and a coolant temperature sensor 26 that detects a coolant temperature. In the present embodiment, a configuration is adopted in which the heat exchange unit 27 is disposed in a manner of surrounding the ultrasonic treatment device 12 and cooling is performed during the ultrasonic treatment, but the present invention is not limited thereto. For example, a configuration may be adopted in which the cooling is performed between the end of the ultrasonic treatment and the start of the impregnation process.

The main pump 16, the circulation pump 17, the reverse pump 18, and the ultrasonic treatment device 12 are controlled by a controller 22 based on a detection value of a flowmeter 19 and the like. The controller 22 also controls the cooling pump 25 based on detection values of a temperature sensor 20 and the coolant temperature sensor 26.

Here, a reason for performing the ultrasonic treatment on the insulating varnish 30 and an effect of the processing will be described.

A filler for improving an insulation property, a filler for improving adhesiveness, and the like are added to the insulating varnish 30, and in order to exhibit desired performances, these fillers need to be in a state of being sufficiently dispersed (also referred to as the "dispersion state"). However, the fillers have a characteristic that the smaller the particle diameter, the more easily the fillers aggregate with each other, and thus it is difficult to form the dispersion state.

When the fillers aggregate with each other, an apparent particle diameter of the insulating varnish 30 increases, making it difficult for the fillers to penetrate into the insulating sheet 5 and the gaps between the winding wires.

When the insulating varnish 30 does not penetrate into the gaps between the winding wires, the gaps become voids after the insulating varnish 30 is cured. The greater the number of voids, the lower the strength of the coil 4 after the insulating varnish 30 is cured. That is, when the insulating varnish 30 that is not in the dispersion state is used, an effect of preventing the deformation of the coil 4 when the external force is applied may not be obtained.

When the insulating varnish 30 does not penetrate into the insulating sheet 5, an adhesive strength of the coil 4, the insulating sheet 5, and the iron core 3 is lower than that of a case where the insulating varnish 30 penetrates into the insulating sheet 5 (this fact will be described later). That is, when the insulating varnish 30 that is not in the dispersion state is used, an effect of preventing the displacement of the coil 4 when the external force is applied may not be obtained.

Therefore, in the present embodiment, in order to bring the insulating varnish 30 into the dispersion state, the insulating varnish 30 is subjected to the ultrasonic treatment in which irradiation is performed with ultrasonic waves. Considering only the dispersion state, the insulating varnish 30 in the immersion tank 15 may be subjected to the ultrasonic treatment in the above impregnation process. However, in this case, the winding wires constituting the coil 4 vibrate due to the irradiation of the ultrasonic waves, and the winding wires rub against each other, thereby deteriorating an insulating coating. On the other hand, in the present embodiment, the ultrasonic treatment is performed before impregnating the coil 4, and thus the deterioration of the insulating coating of the winding wire can be prevented.

When the irradiation is performed with the ultrasonic waves, particles in the insulating varnish 30 vibrate, and thus a temperature of the insulating varnish 30 increases. The temperature increase leads to acceleration of deterioration of the insulating varnish 30, and thus in the present embodiment, the temperature increase of the insulating varnish 30 is prevented by the above cooling system. However, when the temperature of the insulating varnish 30 is lower than an appropriate range, the impregnation of the coil 4 is insufficient. Therefore, the controller 22 detects the temperature of the insulating varnish 30 by the temperature sensor 20, and controls the cooling pump 25 according to a detection result. The above appropriate range is determined by a type, a component, and the like of the insulating varnish 30 to be used.

Figure 4:
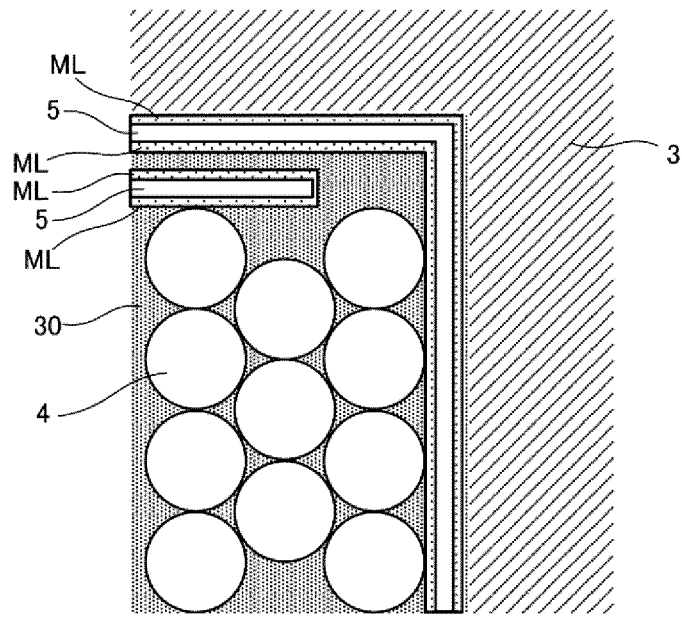
FIG. 4 is an enlarged cross-sectional view of the rotor impregnated with the insulating varnish.
Figure 5:
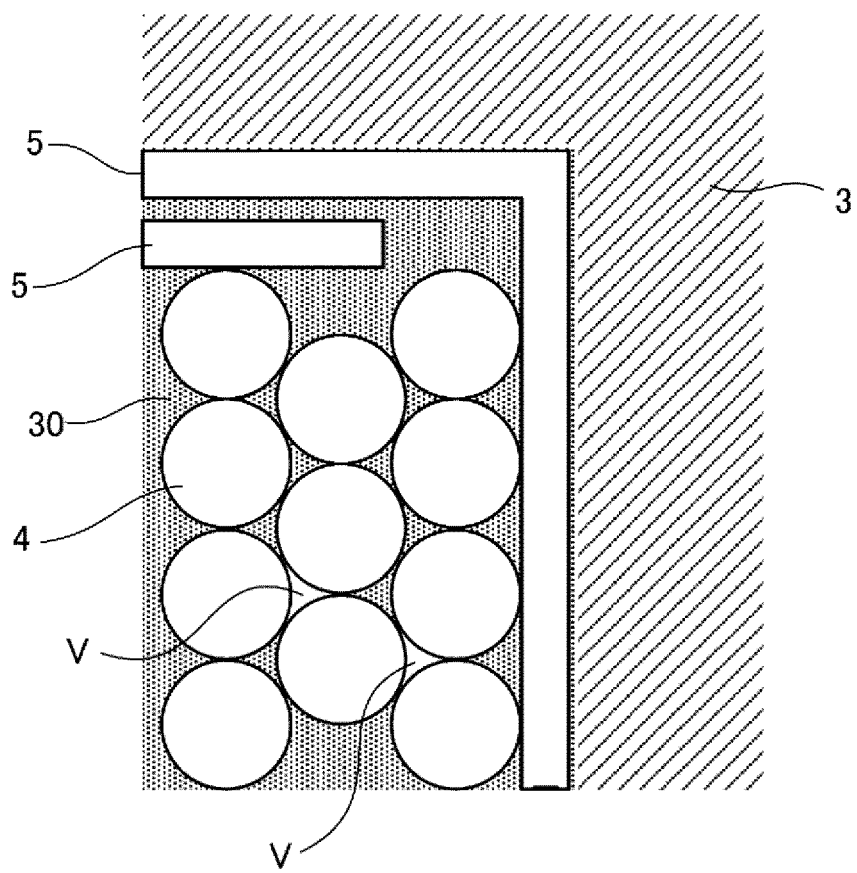
FIG. 5 is an enlarged cross-sectional view of the rotor for comparison.

Next, an effect of impregnating with the insulating varnish 30 subjected to the ultrasonic treatment will be described. FIG. 4 is an enlarged cross-sectional view of a part of the rotor 1 in which the coil 4 is impregnated with the insulating varnish 30 subjected to the ultrasonic treatment. The part herein is a region A in FIG. 2. FIG. 5 is a comparative example, and is an enlarged cross-sectional view of a part of the rotor 1 impregnated with the insulating varnish 30 not subjected to the ultrasonic treatment.

As shown in FIG. 4, the insulating varnish 30 subjected to the ultrasonic treatment penetrates into the gaps between the winding wires of the coil 4 and the gap between the coil 4 and the iron core 3. Mixed layers ML in which the penetrated insulating varnish 30 and the insulating sheet 5 are mixed are formed in a predetermined range from a surface layer to an interior of the insulating sheet 5. These layers are formed due to the insulating varnish 30 which is brought into the dispersion state by the ultrasonic treatment. The "predetermined range" herein is determined according to the dispersion state of the particles in the insulating varnish 30 which is determined by the ultrasonic treatment and the temperature of the insulating varnish 30 at the time of the ultrasonic treatment. That is, as the particles are more dispersed, the insulating varnish 30 more easily penetrates into the insulating sheet 5, and thus the "predetermined range" becomes larger.

On the other hand, when the impregnation is performed with the insulating varnish 30 not subjected to the ultrasonic treatment, as shown in FIG. 5, voids V are scattered in the gaps between the winding wires of the coil 4. The insulating varnish 30 does not penetrate into the insulating sheet 5, and no mixed layer is formed. This is because the insulating varnish 30 is not in the dispersion state and cannot penetrate into the insulating sheet 5 and the gaps between the winding wires.

As described above, there are structural differences in the number of voids between the winding wires and the presence or absence of the mixed layer between a case where the ultrasonic treatment is performed and a case where the ultrasonic treatment is not performed. Hereinafter, characteristic differences caused by the structural differences will be described.

[Regarding Adhesive Strength]

First, a method for evaluating the characteristic differences will be described.

The coil 4 was cut out from the rotor 1 in which the coil 4 was impregnated with the insulating varnish 30 subjected to the ultrasonic treatment, and a cut out portion was used as a sample 1. The cut out portion is a portion along the tooth 3A in the slot 3B. The coil 4 was similarly cut out from the rotor 1 in which the coil 4 was impregnated with the insulating varnish 30 not subjected to the ultrasonic treatment, and a cut out portion was used as a comparative sample.

Then, states of surfaces (also referred to as comparative surfaces) of the sample 1 and the comparative sample, which were facing the insulating sheet 5, were compared. In both the sample 1 and the comparative sample, the insulating sheet 5 is peeled off in a process of cutting out from the rotor 1.

Next, evaluation results will be described. A part of the insulating sheet 5 was confirmed on the comparative surface of the sample 1. From this fact, it can be seen that in the sample 1, the insulating sheet 5 was broken when the insulating sheet 5 was peeled off.

In contrast, the insulating sheet 5 was not confirmed on the comparative surface of the comparative sample. From this fact, it can be seen that in the comparative sample, the insulating varnish 30 did not penetrate into the insulating sheet 5, and an interface between the insulating varnish 30 and the insulating sheet was broken when the insulating sheet 5 was peeled off.

In general evaluation of a bonding surface by an adhesive, it is said that a bonding surface in which an adherend is broken when an external force is applied has a higher adhesive strength than a bonding surface in which an interface between an adherend and an adhesive is broken. From this fact, it can be said that an adhesive strength with the insulating sheet 5 was higher in the sample 1 than in the comparative sample. The fact that the insulating varnish 30 and the insulating sheet 5 are strongly adhered to each other also means that the coil 4 and the insulating sheet 5 are strongly adhered to each other. It is also presumed that adhesion between the insulating sheet 5 and the iron core 3 is similarly strong.

From the above, it can be seen that, by using the insulating varnish 30 subjected to the ultrasonic treatment, the iron core 3, the coil 4, and the insulating sheet 5 are strongly adhered to each other, and the displacement of the coil 4 with respect to the iron core 3 when the external force is applied is prevented, as compared with a case of using the insulating varnish 30 not subjected to the ultrasonic treatment.

[Regarding Torsional Strength]

Figure 6:
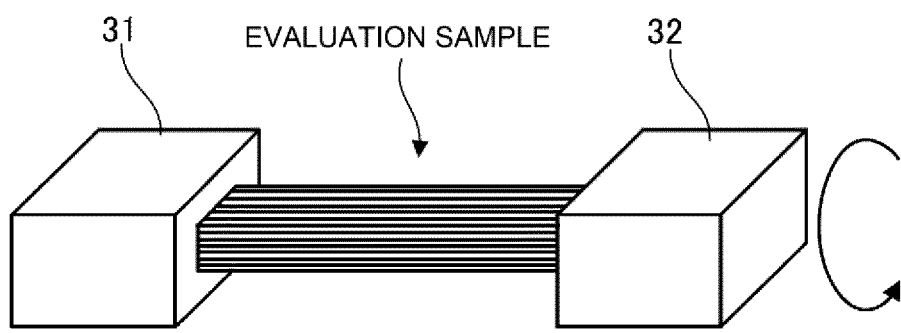
FIG. 6 is a diagram showing a method for evaluating a torsional strength.

FIG. 6 is a diagram showing a method for evaluating a torsional strength. The sample 1 and the comparative sample described above are used as evaluation samples. Both ends of the evaluation sample are gripped by a fixed chuck 31 and a rotation chuck 32, respectively, and the rotation chuck 32 is rotated to twist the evaluation sample. Then, a force required for twisting by a predetermined angle is measured, and this force is used as an evaluation index of the torsional strength.

For more accurate evaluation, a plurality of samples 1 and a plurality of comparative samples were prepared, and the above evaluation was performed on all the samples.

Evaluation results showed that the sample 1 had 2 to 2.5 times the torsional strength as compared with the comparative sample. As compared with the insulating varnish 30 which is brought into the dispersion state by the ultrasonic treatment, the insulating varnish 30 that is not in the dispersion state is difficult to penetrate into the gaps between the winding wires. Therefore, the comparative sample has more voids in the gaps between the winding wires than the sample 1. It is presumed that this difference in the number of voids is a reason for the above difference in torsional strength.

The higher the torsional strength, the smaller an amount of deformation when the external force is applied. Therefore, the sample 1 can prevent the deformation of the coil 4 as compared with the comparative sample.

In the present embodiment, the iron core 3, the coil 4, and the insulating sheet 5 of the rotor 1 have been described, but the present invention is similarly applicable to a stator core (iron core), a stator coil, and an insulating sheet of the stator.

As described above, the present embodiment provides the rotating electric machine in which the coil 4 wrapped in the insulating sheet 5 is fixed to the slot 3B provided in the iron core 3. The insulating sheet 5 has the porous structure, the coil 4 and the insulating sheet 5, and the insulating sheet 5 and the iron core 3 are each fixed by the insulating varnish 30 which is brought into the dispersion state by the ultrasonic irradiation, and the mixed layers ML in which the insulating varnish 30 and the insulating sheet 5 are mixed due to the penetration of the insulating varnish 30 are formed in at least the predetermined range from the surface layer to the interior of the insulating sheet 5. The insulating varnish in the dispersion state easily penetrates into the gaps between the winding wires of the coil 4. The fact that the mixed layer ML is formed means that the adhesive strength due to the insulating varnish 30 is high. Therefore, according to the present embodiment, the deformation and the displacement of the coil 4 when the external force is applied can be prevented.

The present embodiment provides a coil fixing method for a rotating electric machine in which the coil 4 wrapped in the insulating sheet 5 is fixed to the slot 3B provided in the iron core 3. The coil fixing method includes: bringing the insulating varnish into the dispersion state by performing the irradiation with the ultrasonic waves; impregnating the insulating sheet 5 and the coil 4 inserted in the slot 3B with the insulating varnish 30 in the dispersion state; and curing the insulating varnish 30 with which the insulating sheet 5 and the coil 4 are impregnated. When the ultrasonic treatment is performed at the same time as the process of impregnating the coil 4 and the like with the insulating varnish 30, the coatings of the winding wires constituting the coil 4 may rub against each other due to the vibration caused by the ultrasonic irradiation, and may be damaged. On the other hand, in the present embodiment, the ultrasonic treatment is performed before the impregnation, and thus the damage of the coatings of the winding wires can be prevented.

In the present embodiment, the coil fixing method further includes: cooling the insulating varnish 30 before impregnating the insulating sheet 5 and the coil 4. Although the temperature of the insulating varnish 30 increases by the irradiation with the ultrasonic waves, the temperature increase leads to the acceleration of the deterioration of the insulating varnish 30. In this regard, in the present embodiment, the temperature increase can be prevented, and thus the deterioration of the insulating varnish 30 can be prevented.

Although the embodiment of the present invention has been described above, the above embodiment is merely a part of application examples of the present invention, and does not intend to limit the technical scope of the present invention to the specific configurations of the above embodiment.

The invention claimed is:

1. A rotating electric machine comprising:
   an iron core comprising a slot;
   a coil fixed in the slot of the iron core; and
   an insulating sheet in which the coil is wrapped, the insulating sheet having a porous structure, wherein:
   the coil and the insulating sheet are fixed to each other by an insulating varnish,
   the insulating sheet and the iron core are fixed to each other by the insulating varnish that contains at least one type of filler,
   the insulating varnish penetrates the insulating sheet from a surface of the insulating sheet to an interior of the insulating sheet so as to form a mixed layer in which the insulating sheet are mixed, and
   the mixed layer is formed by penetrating the insulating sheet with the insulating varnish while the insulating varnish is in a dispersion state in which the at least one type of filler is dispersed in the insulating varnish, the dispersion state caused by performing an ultrasonic treatment of irradiating the insulating varnish containing the at least one type of filler with ultrasonic waves.

2. The rotating electric machine according to claim 1, wherein:
   the insulating sheet is a mesh-shaped sheet having a mesh diameter larger than a particle diameter of the insulating varnish in the dispersion state.

3. The rotating electric machine according to claim 1, wherein:
   the dispersion state of particles in the insulating varnish is determined by the ultrasonic treatment and a temperature of the insulating varnish at a time of the ultrasonic treatment.

4. A coil fixing method for a rotating electric machine comprising a coil wrapped in an insulating sheet and fixed to a slot in an iron core, the method comprising:
   performing ultrasonic treatment of irradiating an insulating varnish containing at least one type of filler with ultrasonic waves so as to bring the insulating varnish into a dispersion state in which the at least one type of filler is dispersed in the insulating varnish;
   impregnating the insulating sheet and the coil inserted in the slot with the insulating varnish while the insulating varnish is in the dispersion state so as to form a mixed layer in which the insulating sheet are mixed; and
   curing the insulating varnish with which the insulating sheet and the coil are impregnated.

5. The coil fixing method for a rotating electric machine according to claim 4, further comprising:
   cooling the insulating varnish before impregnating the insulating sheet and the coil.

6. The coil fixing method for a rotating electric machine according to claim 4, wherein:
   the insulating sheet is a mesh-shaped sheet having a mesh diameter larger than a particle diameter of the insulating varnish in the dispersion state.

* * * * *